Aug. 12, 1952  B. D. McINTYRE  2,606,592
VEHICLE SEAT CONSTRUCTION

Filed Feb. 21, 1948  3 Sheets-Sheet 1

INVENTOR.
BROUWER D. McINTYRE
BY
Whittemore Hulbert & Belknap
ATTORNEYS

Aug. 12, 1952　　　　B. D. McINTYRE　　　　2,606,592
VEHICLE SEAT CONSTRUCTION
Filed Feb. 21, 1948　　　　　　　　　　　　3 Sheets-Sheet 2
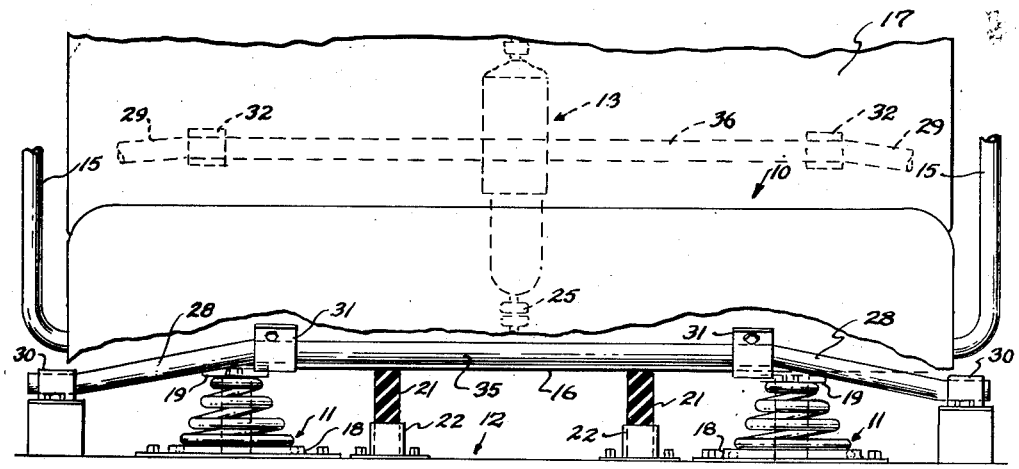
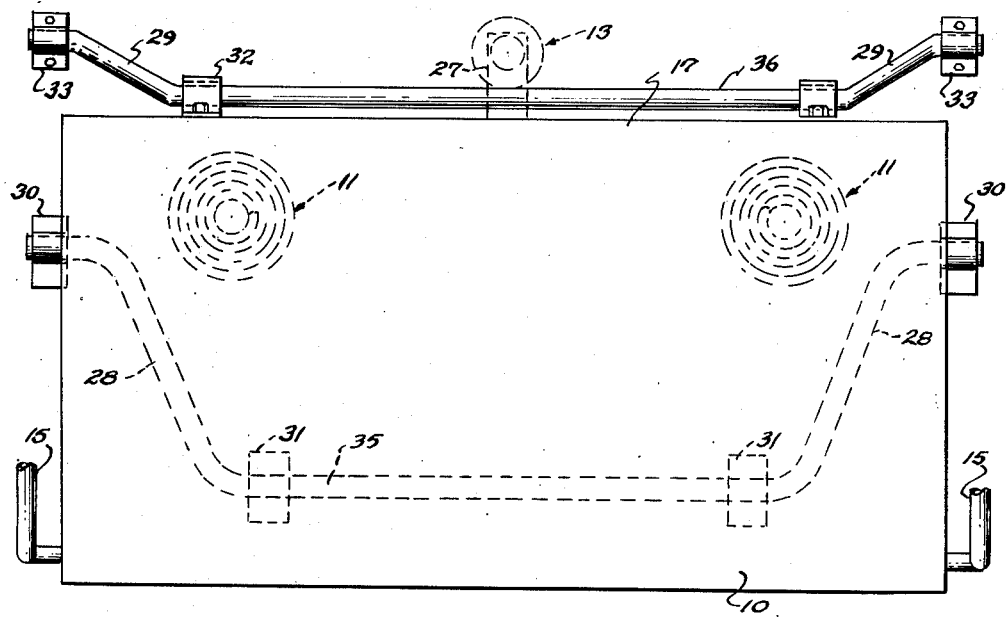
INVENTOR.
BROUWER D. McINTYRE
BY
Whittemore Hulbert & Belknap
ATTORNEYS Aug. 12, 1952     B. D. McINTYRE     2,606,592
VEHICLE SEAT CONSTRUCTION
Filed Feb. 21, 1948     3 Sheets-Sheet 3

INVENTOR.
BROUWER D. McINTYRE
BY
Whittemore Hulbert & Belknap
ATTORNEYS

Patented Aug. 12, 1952

2,606,592

UNITED STATES PATENT OFFICE 2,606,592

VEHICLE SEAT CONSTRUCTION

Brouwer D. McIntyre, Monroe, Mich., assignor to Monroe Auto Equipment Company, Monroe, Mich., a corporation of Michigan Application February 21, 1948, Serial No. 10,190

2 Claims. (Cl. 155—9)

This invention relates to vehicle seat constructions, and refers more particularly to improved supporting means for such seats, and is a continuation of my copending application, Serial No. 567,647, filed December 11, 1944, which later became abandoned.

One of the principal objects of this invention is to provide an improved seat supporting unit embodying:

(a) Spring means for cushioning shocks resulting from the passage of the vehicle ground-engaging wheels over uneven road surfaces;

(b) Shock absorbing means for controlling the action of the spring means and for effectively damping recoil of the spring means; and (c) Means for guiding vertical movement of the seat in a substantially straight-line path of travel.

Another object of this invention is to provide guiding means of the above general type having the additional function of maintaining the vehicle seat on a substantially even keel regardless of the distribution of load on the seat and having the further function of resisting angular or tipping movement of one side of the seat relative to the opposite side, as may be the case when wheels at opposite sides of the vehicle alternately pass over "bumps" on the road surface. In accordance with this invention, vertical movement of the seat is guided by pairs of parallel links respectively positioned at opposite sides of the seat, with the opposite ends thereof respectively pivotally connected to a fixed part of the vehicle and to a part of the vehicle seat. Also, one or more pairs of corresponding links at opposite sides of the seat are connected together by a torsion bar or bars having torsional characteristics predetermined so that elastic torsional deformation of the bar or bars occurs when movement of either ground-engaging wheel with reference to the body is different from that of the opposite wheel. This feature restricts tipping or angular motion of the seat and contributes materially to obtaining ideal riding qualities.

The foregoing, as well as other objects, will be made more apparent as this description proceeds, especially when considered in connection with the accompanying drawings wherein:

Figure 2 is a fragmentary front elevation of the seat shown in Figure 1;

Figure 3 is a fragmentary plan view of a part of the seat shown in Figure 1.

Figure 1:
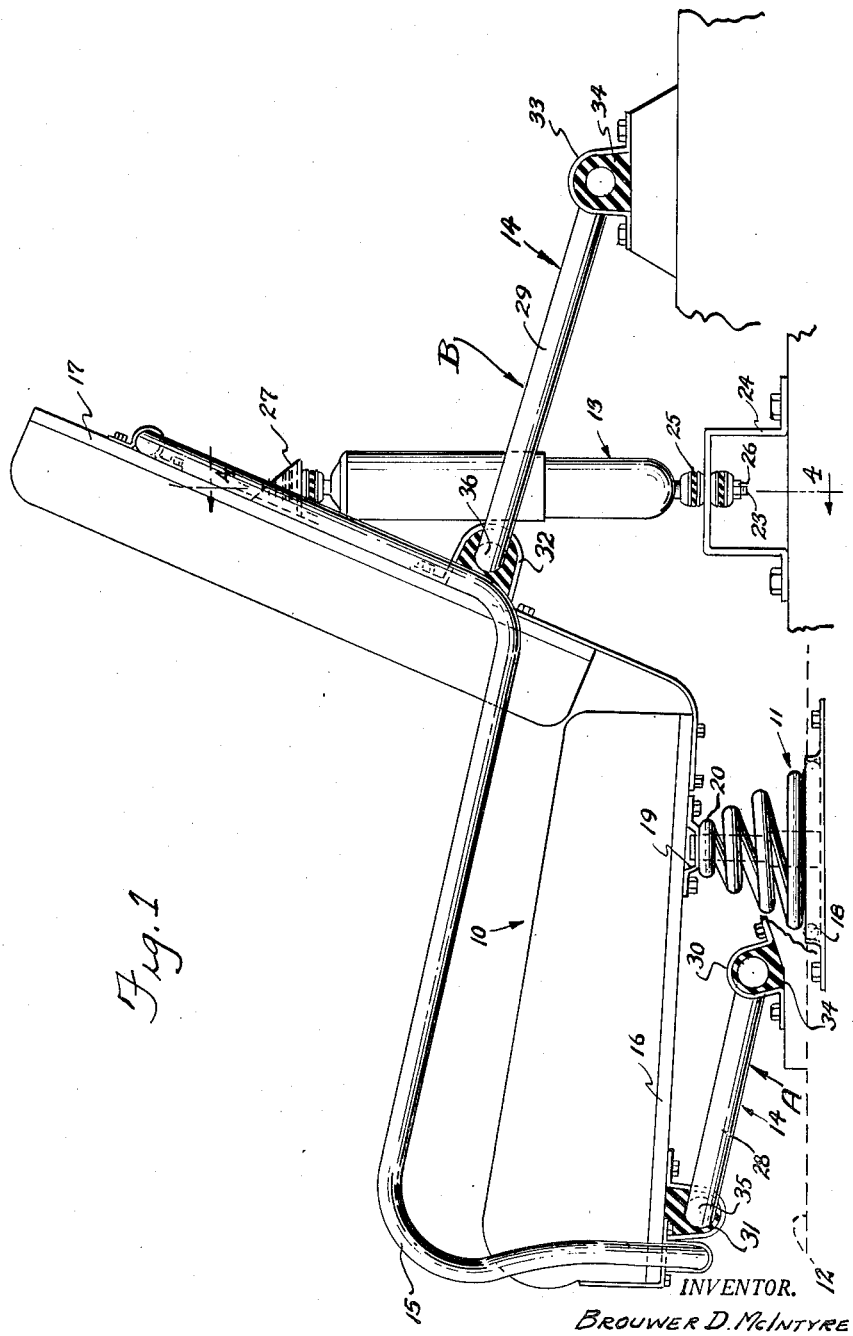
Figure 1 is a side elevation partly in section of a vehicle body seat constructed in accordance with this invention.

Referring now more in detail to the drawings, it will be noted that the reference character 10 designates a seat member, 11 indicates a pair of conical coil springs for supporting the seat 10 from the flooring 12 of the vehicle body, 13 designates a shock absorber for controlling the action of the conical coil springs 11, and 14 indicates the combined guiding and stabilizing means for the vehicle seat 10.

The seat member 10, selected for the purpose of illustration, comprises a tubular supporting frame 15 having a seat cushion supporting base 16 and having a back cushion supporting frame 17. The back portion 17 is secured to the base portion 16 to form an assembly, and the latter is supported from the flooring 12 or other fixed part of the vehicle body by the conical coil springs 11.

The conical coil springs 11 are positioned beneath the base portion 16 of the seat 10 and are respectively located adjacent opposite sides of the seat 10 in relatively close proximity to the rear edge of the base portion 16. It will be noted that the coil springs are of the conical type characterized in that succeeding convolutions are adapted to nest one within the other upon deflection of the springs. This construction is advantageous in that it enables supporting the seat in relatively close proximity to the vehicle body flooring 12 and at the same time provides ample clearance for deflection of the seat. These springs are constructed so as to have low deflection rates through normal oscillations and so as to have increasingly higher rates of deflection as the spring approaches its completely compressed position. Due to this spring construction, the person sitting in the seat obtains the optimum in riding comfort because of the variable rate characteristics of the spring which make it very hard to bottom the same while at the same time having low deflection rates through normal riding conditions. Likewise, this spring provides an excellent riding seat regardless of the weight of the person sitting on the same.

Upon reference to Figures 1 and 2, it will be noted that the lowermost convolution of each spring 11 is supported in a retainer 18 which in turn is secured to the flooring 12 of the vehicle body, and the uppermost convolution of each spring engages an abutment 19. The abutments 19 are in the form of plates which are secured to the underside of the base portion 16 of the seat 10, and each plate is provided with a depending projection 20 which extends downwardly into the upmost convolution of each spring 11. Thus the springs 11 are effectively anchored against shifting movement laterally with respect to either the seat 10 or the vehicle body flooring 12.

If desired, downward movement of the vehicle seat 10 may be limited by providing suitable bumpers 21. In the present instance, one bumper 21 is supported on the flooring 12 of the vehicle body adjacent each spring 11, and each bumper is provided with an abutment 22 preferably formed of rubber or some material having characteristics similar to rubber.

The rebound motion of the conical coil springs 11 is controlled and dampened by the shock absorber 13. In the interest of simplicity and economy in manufacture, only one shock absorber is provided. This shock absorber is positioned at the rear of the seat 10 intermediate opposite sides of the latter and is of the tubular direct-acting hydraulic type. As shown particularly in Figure 1, the shock absorber 13 is supported with its axis extending substantially vertically and the opposite ends of the shock absorber are respectively connected to the flooring 12 of the vehicle body and to the back portion 17 of the seat 10. The lower end of the shock absorber 13 is provided with a stud 23, and the latter is secured to a bracket 24 which in turn is bolted or otherwise secured to the flooring 12 of the vehicle body. Suitable rubber or rubber-like washers 25 are positioned on the stud 23 at opposite sides of the bracket and are clamped to the latter by means of a nut 26. This construction enables limited angular movement of the shock absorber relative to the bracket 24. The upper end of the shock absorber is similarly attached to a bracket 27, and the latter in turn is secured to the rear side of the back portion 17 of the seat. The shock absorber 13 is preferably of the type which dampens the recoil action of the springs 11 and will be more fully hereinafter described.

The combined guiding and stabilizing means 14 comprises a pair of yokes A and B. The yoke A is supported below the base portion 16 of the seat 10 adjacent the front edge of the latter and is provided with arms 28 respectively positioned adjacent opposite sides of the seat. The arms extend rearwardly from the yoke A, and the rear ends thereof are bent outwardly for pivotal connection to the vehicle body flooring 12 by brackets 30 adjacent the springs 11. The front ends of the arms are integrally connected by a leveling or torsion bar 35 which in turn is rotatably supported adjacent the upward end of the base portion 16 of the seat by means of brackets 31. The arms 28 are therefore relatively long so that they pivot through a comparatively large arc thereby guiding the seat in a substantially straight-line path of travel. If the arms were short, they would turn through a short arc and would therefore impart a pitching action to the seat rider.

The yoke B is positioned at the rear of the seat and above the yoke A and comprises a leveling or torsion bar 36 having arms 29 extending rearwardly from the opposite ends thereof. The arms 29 are as long as, and are preferably longer than the arms 28. The bar 36 is rotatably supported on the seat back 17 by brackets 32, and the rear ends of the arms 29 are bent laterally outwardly for pivotal connection to the flooring 12 by means of brackets 33. Upon reference to Fig. 1 of the drawings, it will be noted that the rear end portions of both pairs of arms are anchored in their respective brackets by rubber blocks 34. The blocks 34 permit relatively free pivotal movement of the arms and at the same time eliminate any possibility of objectionable noises.

Inasmuch as both pairs of arms are substantially parallel to one another and have the opposite ends respectively pivotally connected to the seat and to a fixed part of the vehicle, it will be noted that these arms form in effect a parallelogram stabilizing arrangement which serves to guide vertical movement of the seat. Due to the fact that the arms are relatively long, the seat will be guided in a substantially straight-line path of travel. This feature contributes materially to the other features of this invention in providing the occupants of the seat with maximum riding comfort. Likewise, as the yokes A and B are both vertically and horizontally offset with respect to each other, they can never reach a neutral position where they would lock or tend to rotate in opposite directions with respect to each other.

Actually the arms 28 and 29 are formed integral with their respective bars 35 and 36, as shown in Figure 3, although this is not essential to the successful operation of the links or torsion bars. In any event, however, the torsional characteristics of both bars are predetermined so that the bars will twist to some extent when movement of either ground-engaging wheel of the vehicle with reference to the body is different from that of the opposite ground-engaging wheel. This torsional deformation of the bars is advantageous in that it restricts tipping or angular motion of the seat 10 when wheels at opposite sides of the vehicle alternately pass over "bumps" on the road.

Although torsional deformation of the bars is provided for, nevertheless it will be noted that the bars together with their respective arms serve to maintain the seat 10 on a substantially even keel when the load on one side of the seat exceeds the load on the opposite side. In other words, any force tending to move one side of the seat downwardly to a greater extent than the opposite side will be transferred to the latter side, tending to effect uniform movement of both sides of the seat. This feature is highly advantageous in the present instance because vehicle seats are usually subjected to differential load conditions.

Figure 4:
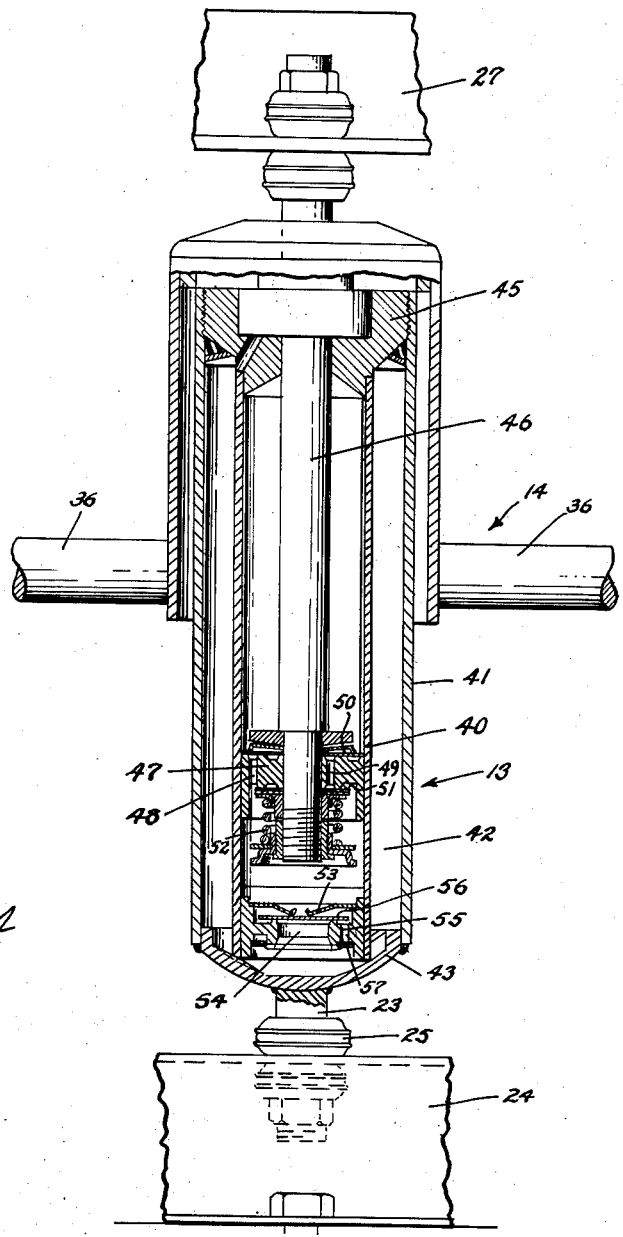
Figure 4 is a sectional view taken substantially on the plane indicated by the line 4—4 of Figure 1.

While any one of a number of different types of direct-acting shock absorbers may be employed in the seat assembly previously described, nevertheless the type shown in Figure 4 of the drawings is selected for the purpose of illustration. Briefly, the shock absorber 13 comprises a pressure cylinder 40 and an outer casing 41 cooperating with the pressure cylinder to provide a reservoir 42 for a hydraulic fluid medium. The lower end of the reservoir is closed by a cap 43 having the stud 23 welded or otherwise secured thereto and enabling the lower end of the shock absorber to be attached to the bracket 24 in the manner hereinbefore described. The upper end of the reservoir is closed by a suitable plug 45 which is centrally apertured to receive a piston rod 46 having a piston 47 secured to the lower end thereof.

The piston 47 is provided with an outer series of ports 48 and with an inner series of ports 49. The outer series of ports 48 are normally closed by a check valve 50, and the inner series of ports 49 are normally closed by a laminated pressure relief valve 51 which is clamped to the bottom of the piston by means of the spring 52. The above construction is such as to enable relatively free flow of fluid through the piston in an upward direction and to provide a more restricted flow of fluid downwardly through the piston. As a result, the shock absorber effectively dampens the recoil action of the springs 11 and the extent of this damping action may be varied by adjusting the pressure applied to the valve 51 by the coil spring 52.

The lower end of the cylinder 40 is closed by a valve 53 having a central opening 54 communicating with the reservoir 42 and having a series of ports 55 surrounding the central opening 54 in communication with the reservoir. The flow of fluid into the cylinder 40 through the central opening 54 is controlled by a check valve 56, and the flow of fluid from the cylinder to the reservoir through the ports 55 is regulated by a laminated pressure relief valve 57. This construction enables relatively free flow of fluid from the reservoir 42 to the cylinder 40 and a much more restricted flow of fluid from the cylinder 40 to the reservoir 42. This arrangement cooperates with the control through the piston to insure damping the recoil action of the springs 11, as will be more fully understood when considering the operation of the shock absorber.

In operation, when the piston 47 travels downwardly, the fluid in the cylinder 40 below the piston passes upwardly through the series of ports 48, and the pressure of this fluid unseats the check valve 50 to enable the fluid to enter the portion of the cylinder above the piston. Due to the fact that the piston rod 46 occupies a position in a portion of the cylinder 40 above the piston 47, it follows that the available space in this portion of the cylinder is less in volume than the space below the piston. Thus as the piston continues to move downwardly, sufficient pressure is built up against the valve 57 to unseat the latter and permit the excess fluid to flow into the reservoir 42.

On the other hand, when the piston moves in an upward direction in the cylinder 40, fluid under pressure acts on the check valve 56 to open the latter and permit fluid under pressure to flow into the portion of the cylinder below the piston. As the piston 47 travels upwardly in the cylinder 40, the piston rod 46 moves out of the cylinder and therefore it is necessary to replenish the cylinder with a quantity of hydraulic fluid medium. This required additional amount of fluid is supplied by the reservoir 42 through the check valve 56 which opens relatively freely so that very little or no resistance is offered to the flow of fluid into the cylinder. From the above brief description of the shock absorber, it will be apparent that the construction is such as to materially dampen shocks transmitted to the springs 11.

I claim:

1. A vehicle seat construction adapted to be mounted on a vehicle supporting member, including a seat member, a conical coil spring having one end engaging the underside of said seat member adjacent the back edge thereof and the other end adapted to be supported by the vehicle supporting member, said spring being constructed so as to have low deflection rates through normal oscillations and increasingly higher deflection rates as said spring approaches its completely compressed position, a hydraulic tubular direct-acting shock absorber having one end thereof connected to said seat member and the other end adapted to be connected to said vehicle supporting member so as to dampen the rebound motion of said spring, and stabilizing means for said seat member including a first leveling bar extending below and laterally of said seat member adjacent the front edge of and journaled on said seat member, arms extending laterally from said leveling bar and rearwardly with respect to said seat having their free ends adapted to be pivotally connected to said vehicle supporting member in close proximity to said spring, said arms being substantially longer than the length of the vertical path of travel of said leveling bar, and a second leveling bar extending parallel to said first leveling bar rearwardly of said seat member, said second leveling bar being both vertically and horizontally offset with respect to said first leveling bar and being pivotally connected to the rear portion of said seat member, arms extending laterally from said second leveling bar and rearwardly from said seat and having their free ends adapted to be pivotally connected to said vehicle supporting member rearwardly of said seat, said second leveling bar arms being of a greater length than said first leveling bar arms so as to cooperate with said first leveling bar and arms to guide vertical movement of said seat member in a substantially straight-line path of travel and so as to stabilize said seat member and restrict tipping or angular movement of the latter with respect to said vehicle supporting member.

2. A vehicle seat construction adapted to be mounted on a vehicle supporting member, including a seat member, a spring having one end engaging the underside of said seat member adjacent the back edge thereof and the other end adapted to be supported by the vehicle supporting member, a hydraulic tiubular direct-acting shock absorber having one end thereof connected to said seat member and the other end adapted to be connected to said vehicle supporting member so as to dampen the rebound motion of said spring, and stabilizing means for said seat member including a leveling bar extending below and laterally of said seat member adjacent the front edge of and journaled on said seat member, arms extending laterally from said leveling bar and rearwardly with respect to said seat having their free ends adapted to be pivotally connected to said vehicle supporting member in close proximity to said spring, said arms being substantially longer than the length of the vertical path of travel of said leveling bar; and means independent of said stabilizing means and including arms pivotally connected to the rear portion of said seat member and adapted to be pivotally connected to said vehicle supporting member so as to cooperate with said leveling bar and arms to guide vertical movement of said seat member in a substantially straight-line path of travel and so as to stabilize said seat member and restrict tipping or angular movement of the latter with respect to said vehicle supporting member, said means arms being longer than said leveling bar arms.

BROUWER D. McINTYRE.

REFERENCES CITED

The following references are of record in the file of this patent:

UNITED STATES PATENTS

| Number | Name | Date |
|---|---|---|
| 1,616,546 | Pierson | Feb. 8, 1927 |
| 1,929,023 | Hickman | Oct. 3, 1933 |
| 2,162,476 | Casper | June 13, 1939 |
| 2,357,825 | Hickman et al. | Sept. 12, 1944 |
| 2,366,730 | Hickman | Jan. 9, 1945 |

FOREIGN PATENTS

| Number | Country | Date |
|---|---|---|
| 485,235 | France | Sept. 29, 1917 |
| 556,818 | France | Apr. 20, 1923 |